(12) United States Patent
Passmann et al.

(10) Patent No.: US 11,493,624 B2
(45) Date of Patent: Nov. 8, 2022

(54) METHOD AND SYSTEM FOR MAPPING AND LOCATING A VEHICLE BASED ON RADAR MEASUREMENTS

(71) Applicant: Robert Bosch GmbH, Stuttgart (DE)

(72) Inventors: Christian Passmann, Diekholzen (DE); Daniel Zaum, Sarstedt (DE); Peter Christian Abeling, Hannover (DE)

(73) Assignee: Robert Bosch GmbH, Stuttgart (DE)

(*) Notice: Subject to any disclaimer, the term of this patent is extended or adjusted under 35 U.S.C. 154(b) by 364 days.

(21) Appl. No.: 16/648,691

(22) PCT Filed: Sep. 12, 2018

(86) PCT No.: PCT/EP2018/074678
§ 371 (c)(1),
(2) Date: Mar. 19, 2020

(87) PCT Pub. No.: WO2019/063299
PCT Pub. Date: Apr. 20, 2019

(65) Prior Publication Data
US 2020/0256977 A1 Aug. 13, 2020

(30) Foreign Application Priority Data
Sep. 26, 2017 (DE) .......................... 102017217065.4

(51) Int. Cl.
*G01S 13/89* (2006.01)
*G01S 7/41* (2006.01)
(Continued)

(52) U.S. Cl.
CPC ................ *G01S 13/89* (2013.01); *G01S 7/41* (2013.01); *G01S 13/931* (2013.01); *B60W 60/001* (2020.02)

(58) Field of Classification Search
CPC ........ G01S 7/042; G01S 13/86; G01S 13/867; G01S 13/89; G01S 13/931
See application file for complete search history.

(56) References Cited

U.S. PATENT DOCUMENTS 9,043,072 B1 * 5/2015 Tisdale .................. G05D 1/027
701/28
9,199,643 B1 * 12/2015 Zeng ..................... B60W 40/10
(Continued)

FOREIGN PATENT DOCUMENTS

DE 102015003666 A1 9/2016
JP H10300493 A 11/1998
(Continued)

OTHER PUBLICATIONS

International Search Report for PCT/EP2018/074678, dated Jan. 23, 2019.
(Continued)

*Primary Examiner* — Peter M Bythrow
(74) *Attorney, Agent, or Firm* — Norton Rose Fulbright US LLP; Gerard Messina

(57) ABSTRACT

A method and a system for mapping a surroundings of at least one vehicle and for locating the at least one vehicle. Measurement data of the vehicle's surroundings are ascertained by at least one radar sensor of the at least one vehicle, the measurement data of the at least one radar sensor being aggregated. The aggregated measurement data are compared with already existing aggregated measurement data. The aggregated measurement data are optimized by reducing measurement errors based on the comparison between the aggregated measurement data and the already existing aggregated measurement data. A map is generated or updated on the basis of the optimized aggregated measurement data, and the at least one vehicle being located on the
(Continued)

generated or updated map by comparing the ascertained measurement data with the generated map.

13 Claims, 1 Drawing Sheet

(51) Int. Cl.
   *G01S 13/931* (2020.01)
   *B60W 60/00* (2020.01)

(56) References Cited

U.S. PATENT DOCUMENTS

| | | | | |
|---|---|---|---|---|
| 9,568,611 | B2* | 2/2017 | Cosatto | B60K 35/00 |
| 9,665,100 | B2* | 5/2017 | Shashua | G01C 21/3602 |
| 10,317,903 | B2* | 6/2019 | Shashua | G08G 1/167 |
| 10,386,480 | B1* | 8/2019 | Campbell | G01S 13/931 |
| 2009/0228204 | A1* | 9/2009 | Zavoli | G01C 21/30 |
| | | | | 701/532 |
| 2010/0066587 | A1* | 3/2010 | Yamauchi | G05D 1/0044 |
| | | | | 342/54 |
| 2012/0221168 | A1* | 8/2012 | Zeng | B60W 30/16 |
| | | | | 701/1 |
| 2013/0103298 | A1* | 4/2013 | Becker | G01S 13/89 |
| | | | | 701/300 |
| 2014/0358322 | A1* | 12/2014 | Ibrahim | G05D 1/0055 |
| | | | | 701/1 |
| 2014/0379254 | A1* | 12/2014 | Miksa | G01S 17/42 |
| | | | | 701/450 |
| 2016/0046290 | A1* | 2/2016 | Aharony | B60W 30/0953 |
| | | | | 701/41 |
| 2016/0069985 | A1* | 3/2016 | Kwakkernaat | G08G 1/04 |
| | | | | 342/146 |
| 2016/0139255 | A1* | 5/2016 | Bueschenfeld | G01S 7/411 |
| | | | | 342/146 |
| 2016/0161265 | A1* | 6/2016 | Bagheri | G01S 13/89 |
| | | | | 701/450 |
| 2016/0266256 | A1* | 9/2016 | Allen | G01C 21/26 |
| 2017/0015317 | A1* | 1/2017 | Fasola | G01C 21/165 |
| 2017/0227647 | A1* | 8/2017 | Baik | G01S 17/89 |
| 2017/0236419 | A1* | 8/2017 | Grewe | G08G 1/164 |
| | | | | 340/870.07 |
| 2017/0248960 | A1* | 8/2017 | Shashua | G01C 21/3476 |
| 2018/0024239 | A1* | 1/2018 | Branson | G01S 13/52 |
| | | | | 701/23 |
| 2018/0024562 | A1* | 1/2018 | Bellaiche | G06V 20/588 |
| | | | | 701/26 |
| 2018/0024569 | A1* | 1/2018 | Branson | G01S 13/06 |
| | | | | 701/23 |
| 2018/0038694 | A1* | 2/2018 | Bruemmer | G01C 21/005 |
| 2018/0059231 | A1* | 3/2018 | Dewberry | G01S 13/878 |
| 2018/0066954 | A1* | 3/2018 | Oder | G05D 1/021 |
| 2018/0149744 | A1* | 5/2018 | Bialer | G01S 13/931 |
| 2018/0216942 | A1* | 8/2018 | Wang | G01S 17/89 |
| 2019/0033459 | A1* | 1/2019 | Tisdale | G06V 20/56 |

FOREIGN PATENT DOCUMENTS

| | | |
|---|---|---|
| JP | 2012208525 A | 10/2012 |
| JP | 2016099172 A | 5/2016 |
| WO | 2007051972 A1 | 5/2007 |
| WO | 2016192934 A1 | 12/2016 |
| WO | 2017109977 A1 | 6/2017 |

OTHER PUBLICATIONS

F. Schuster et al., "Robust Localization Based on Radar Signal Clustering", 2016 IEEE Intelligent Vehicles Symposium(IV), 2016, pp. 839-844, XP055534005.

Grisetti, et al.: "A Tutorial on Graph-Based SLAM", IEEE Intelligent Transportation Systems Magazine 2(4), (2010), pp. 31-43, https://ieeexplore.ieee.org/document/568121504.

* cited by examiner

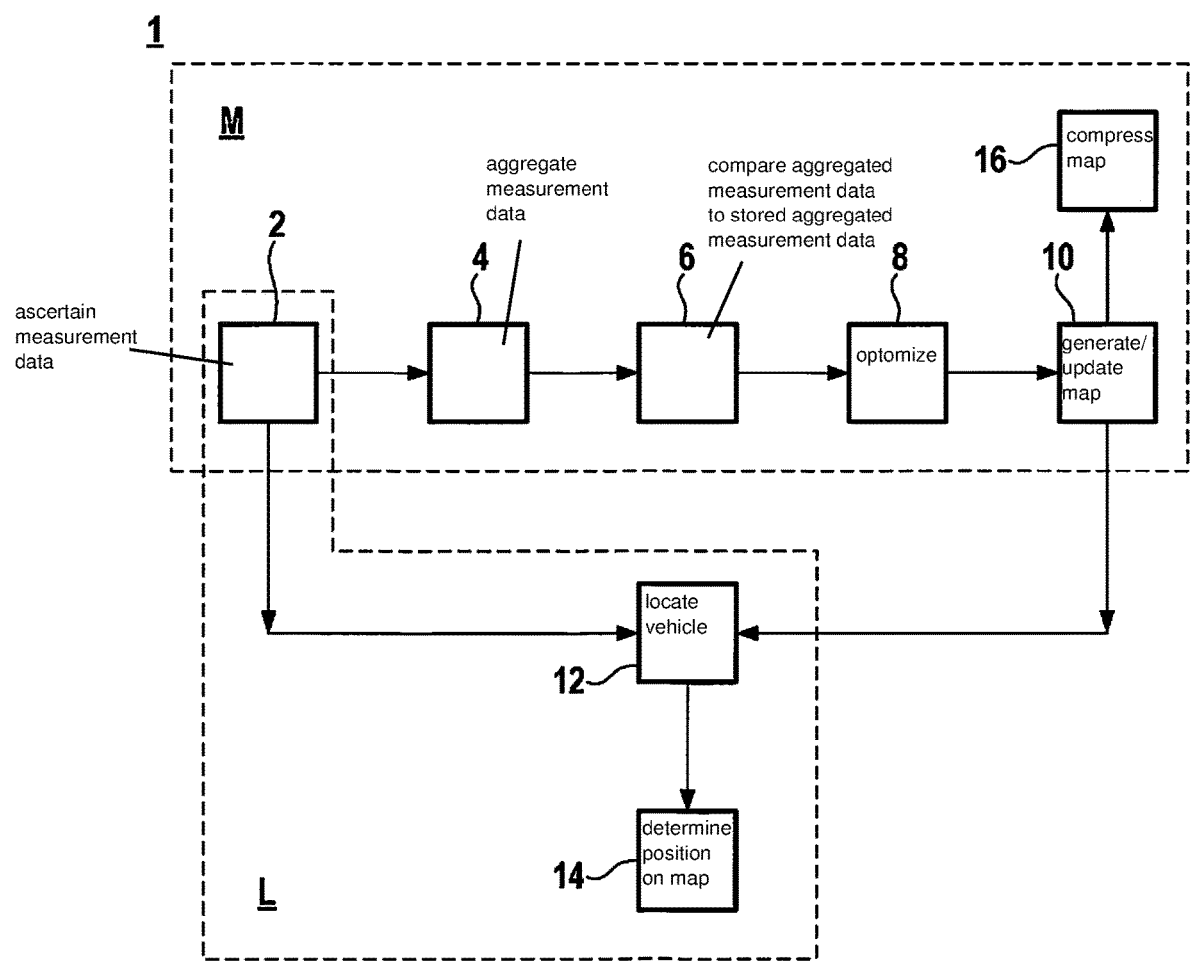

METHOD AND SYSTEM FOR MAPPING AND LOCATING A VEHICLE BASED ON RADAR MEASUREMENTS

FIELD

The present invention relates to a method for mapping a surroundings of at least one vehicle and for locating the at least one vehicle as well as to a system for implementing such a method.

BACKGROUND INFORMATION

Current autonomous or partially autonomous vehicles are highly dependent on provided cartographic information. The cartographic information is used for planning routes and for ascertaining the position of the vehicles. The cartographic information or maps are normally available at different levels. A first level is used for example for planning a precise lane course and driving maneuvers. On the basis of these data, autonomous or partially autonomous vehicles are able to keep to a lane or adapt. Another level has detectable objects, which are detectable by sensors in the vehicle and identifiable by a comparison with the existing information of the information level. On the basis of the identified objects, the vehicles are able to ascertain their relative position with respect to the objects and thus on the map. At another information level of the map, dynamically changing information such as for example road conditions, weather conditions, parking space information or traffic volume may be stored.

To allow for autonomous or partially autonomous driving functions, this cartographic information must be highly up to date and spatially highly accurate.

SUMMARY

An objective of the present invention may be seen as providing a method and a system for generating and updating a map and for identifying at least one vehicle position on the map.

This object may be is achieved by example embodiments in accordance with the present invention. Advantageous developments of the present invention are described herein.

According to one aspect of the present invention, an example method is provided for mapping a surroundings of at least one vehicle and for locating the at least one vehicle. According to the present invention, in a step, measurement data of the vehicle's surroundings are ascertained by at least one radar sensor of the at least one vehicle. The measurement data of the at least one radar sensor are subsequently aggregated and compared with already existing aggregated measurement data.

Based on the comparison between the aggregated measurement data and the already existing aggregated measurement data, the aggregated measurement data are optimized by reducing measurement errors. A map is generated or updated on the basis of the optimized aggregated measurement data. The at least one vehicle is located by comparing the ascertained measurement data with the generated or updated map.

By way of the example method, at least one vehicle is able to generate or update a map with relevant cartographic information. In particular, it is possible to increase the accuracies of the map by repeated measurements. The method also makes it possible to enlarge and optimize existing maps.

The at least one vehicle ascertains and subsequently aggregates in particular radar measurement data by way of the example method. Aggregating the measurement data makes it possible to identify coherent point clouds from the ascertained measurement data, which may be used to reduce a total number of measurement data. Especially in the case of multiple measurements or multiple radar sensors operated in parallel, this may reduce a quantity of measurement data and increase the speed of the method. A portion of the ascertained measurement data may also be sorted out by delimiting the possible surroundings of the vehicle.

The aggregated or condensed point clouds of the measurement data may be compared with already ascertained point clouds and reconciled with one another. As part of this process, it is possible for example to define distances between the point clouds and to compare these to one another so as to minimize deviations of the ascertained measurement data. The distances between the point clouds or the grouped point clouds may also be ascertained by an odometry performed on the radar measurement values.

The error-optimized measurement data or the measurement data of different measurements existing as grouped point clouds are used to generate a map. For this purpose, further corrections may be performed such as for example a geometric rectification or alignment of the respective measurement data with respect to existing measurement data.

Following the generation of the map or the addition of measurement data for updating the map, the map may be compressed in a further step. This makes it possible to reduce the storage space requirement of the map, allowing for quicker access to the map on the part of at least one vehicle.

On the basis of the generated map, the radar measurement data ascertained by at least one vehicle may be used for locating the at least one vehicle. For this purpose, the ascertained measurement data are compared with regard to an agreement with the map. This process may be performed for example in an external server unit or in a cloud.

According to one exemplary embodiment of the method of the present invention, the measurement data of the at least one radar sensor are aggregated by a cluster analysis. The cluster analysis makes it possible to find similarity structures among the ascertained measurement data and the already stored measurement data. This makes it possible to condense measurement data from multiple measurements to a few meaningful measuring data and thus to compensate for deviations and measuring errors.

According to one exemplary embodiment of the method of the present invention, the measurement data of the at least one radar sensor are filtered. It is possible to reduce the number of ascertained measurement data for the further processing or calculation by using a filter. In particular, it is possible to delete illogical measurement data or measurement data lying outside of a scanning pattern. Furthermore, it is possible to use machine learning processes such as adaptive neural networks, for example, to interpret and filter the ascertained measurement values.

According to one exemplary embodiment of the method of the present invention, the aggregated measurement data form nodes, connecting paths between the nodes being formed and compared for the comparison with already existing aggregated measurement data. In analogy to the so-called "graph SLAM" or to the simultaneous locating and map-generating method, this makes it possible for the method to generate nodes and edges and to use these for comparing and optimizing the cartographic information.

According to one exemplary embodiment of the method of the present invention, at least one node is formed based on at least one measurement data cloud. The measurement data clouds may be aligned and brought into congruency with one another for example by a so-called "iterative closest point" algorithm or by an arbitrary point-adaptation algorithm. This makes it possible to condense a distributed measurement data cloud so that the accuracy of further calculations may be increased.

According to one exemplary embodiment of the method of the present invention, the nodes represent measurement locations of the at least one radar sensor, the connecting paths between the measurement locations being ascertained odometrically. The nodes may thus be the locations on the map, at which a radar measurement was respectively performed. By measuring the time between different measurements, it is possible to ascertain a distance between the measurement locations. In particular, it is possible to use odometric methods to ascertain the distance or the connecting path between two nodes. It is possible for example to utilize a radar-based odometry by using several radar measurements performed in succession to ascertain the connecting path. For performing an odometric measurement method, is also possible to use additional sensors, alone or in combination, such as for example acceleration sensors, wheel sensors, LIDAR sensors, ultrasonic distance sensors, cameras and the like.

According to one exemplary embodiment of the method of the present invention, the aggregated measurement data are compared with measurement data of at least one second sensor in order to reduce measurement errors. Additionally, it is possible to use at least one further sensor for reducing the errors of the ascertained radar measurement data. It is possible for example to use LIDAR sensors or camera-based sensors for detecting prominent objects or geometric forms in the surroundings of the vehicle. These features may be compared with the radar measurement data. This makes it possible to sort out or optimize faulty measurement data so that a map generated from the measurement values may have a higher accuracy.

According to one exemplary embodiment of the method of the present invention, the map is updated by superimposing aggregated measurement data. A map may be updated by the method in a technically particularly simple way if newly ascertained measurement values are superimposed on the already stored measurement values or are stored in parallel to them. Alternatively, existing measurement data may be replaced by new measurement data.

According to one exemplary embodiment of the method of the present invention, the generated map is compressed. This reduces the storage space requirement of the map. In particular if the map is provided by an external server unit, this makes it possible for a vehicle to access relevant cartographic information quickly even if connection speeds are impaired as a function of the location.

According to one exemplary embodiment of the method of the present invention, the generated map is compressed by cluster formation, each cluster of the generated map being assigned a time stamp and older clusters being replaced by corresponding current clusters when the map is updated. The map generated or updated from the ascertained and compressed measurement data may be reduced in its storage space requirement in a further step in connection with a cluster formation. This makes it possible to prevent the map from being unusable due to its data size and measurement value density. This process may also be used to update existing maps. For this purpose, the measurement data used for updating the map may be combined into clusters beforehand so that the map may be updated or extended in cluster-wise fashion. In particular, it is possible to apply time stamps to individual clusters of the map. This makes it possible to delete the outdated clusters when taking up current map clusters. In particular, current clusters may be included with a higher weighting for further calculations or route planning.

According to one exemplary embodiment of the method of the present invention, the compressed map is analyzed for detecting objects. It is possible to check the generated and subsequently compressed map with a view to identifiable objects and features. In particular, it is possible to analyze the ascertained measurement values used in the form of the map by a monitored or unmonitored machine learning process or by neural networks for discovering relationships and detectable objects or features. This makes it possible for example to extract landmarks, geographic or geometric features from the measurement values. This makes it possible to simplify or accelerate a localization of the at least one vehicle. In particular, a map of this kind may also be used by vehicles without radar sensors if it is possible to ascertain and compare the extracted features using optical sensors for example.

According to one exemplary embodiment of the method of the present invention, the generated map is linked with at least one geographic map. This makes it possible to connect the generated or updated map with further information levels. It is possible for example to provide traffic information or location-dependent weather data. It is also possible to use conventional GPS data to increase an accuracy and for checking the ascertained measurement data. This makes it possible to reference a located vehicle also on the linked maps in precise fashion. The localization of the at least one vehicle may be implemented preferably by measurement point comparison or by filtering the measurement points with the map data. Furthermore, as a three-dimensional measurement point cloud, the ascertained measurement points may be converted beforehand into a two-dimensional or a 2.5-dimensional point cloud so as to allow for a comparison with a map that is prepared accordingly.

According to another aspect of the present invention of the present invention, a system is provided for implementing the inventive method for mapping a surroundings of at least one vehicle and for locating the at least one vehicle. The system has at least one vehicle having at least one radar sensor for ascertaining measurement data. The system additionally has at least one external processing unit or at least one internal processing unit situated in the at least one vehicle for generating a map based on the ascertained measurement data and for locating the at least one vehicle on the basis of the ascertained measurement data.

The system makes it possible for vehicles to generate and update maps by radar measurement data alone or in combination with at least one external server unit. It is thus in particular possible to provide precise and very current cartographic information for autonomous or partially autonomous driving functions. The measurement data may be processed for example in an external server unit or in multiple external server units. Multiple external server units may form a cloud service for evaluating and providing the measurement data or cartographic information.

Using a "full SLAM" or a "graph SLAM" method, the method according to the present invention makes it possible to condense or compress radar measurement values ascertained in a surroundings of a vehicle and thus to generate coherent measurement point clouds. For this purpose, it is possible to perform a cluster analysis or a sorting out of the measurement data.

The compressed measurement data may be compared with already existing measurement values. In this process, uncertainties of measurement and deviations of the measurements may be reduced in a recognition of measurement values or measurement value patters.

Measurement values optimized in this manner may be used subsequently for generating or updating a map. In a further step, the map may be compressed or subdivided into clusters so that the resulting map has a low storage space requirement.

The radar measurement data ascertained by a vehicle may be compared with the measurement values stored as a map so as to be able to located the vehicle on the map.

A preferred exemplary embodiment of the present invention is explained in more detail below with reference to a highly simplified schematic representation.

BRIEF DESCRIPTION OF THE DRAWINGS

FIG. 1 shows a schematic flow chart of method for mapping a surroundings of at least one vehicle and for locating the at least one vehicle according to a first exemplary embodiment.

DETAILED DESCRIPTION OF EXAMPLE EMBODIMENTS

In a first step 2 of the method 1 according to the present invention, measurement data of the surroundings of the at least one vehicle are ascertained by at least one radar sensor. The at least one radar sensor may be situated in or on the at least one vehicle. The at least one radar sensor may generate radar waves continuously or at defined time intervals and receive radar waves reflected by objects and the vehicle's surroundings based on a time-of-flight analysis. For this purpose, the radar sensor has an electronic controller and an evaluation unit for controlling the generation of radar waves and for evaluating reflected radar waves. The reflected radar waves received by the radar sensor are ascertained in the form of measurement data or measurement points and are stored at least temporarily.

In a further step, the measurement data are aggregated 4. This serves in particular to reduce a measurement data density of the ascertained measurement data and to reduce a storage space requirement of the measurement data. It is thus possible, for example, to transmit the aggregated measurement data from the at least one vehicle to one or multiple external server units via a wireless communication connection. The one or multiple server units are subsequently able to take over the further processing steps at a higher computing power. Alternatively, the at least one vehicle itself may perform the processing steps using an internal control unit or processing unit.

In the aggregation of the measurement data 4, only those measurement data or measurement points are retained from among the ascertained measurement data that are logical and meaningful. In this step 4, it is in particular possible to delete measurement data pointing to ghost targets. For this purpose, it is possible to apply, for example a density-based spatial cluster analysis or a so-called k-means algorithm to the ascertained measurement data. In the aggregation, it is also possible to take into account the directions of beam of the generated and received radar waves. This step makes it possible to combine the ascertained measurement data for example into measurement point clouds or groups of measurement points, it being possible for the groups to be formed respectively as a function of a receiving angle of the reflected radar waves.

In a further step, the previously aggregated measurement data are stored. If already existing aggregated measurement data are stored in a memory, a comparison may be performed in this step 6 between the current aggregated measurement data and the already stored aggregated measurement data. For this purpose, the distances between the formed groups may be measured or calculated, for example, and may be compared to the distances of the already stored data. Furthermore, patterns may be compared between the various data. Such a comparison is able to reduce continuously growing measurement errors of the method 8. For this purpose, the newly ascertained and aggregated measurement data are adapted to the already stored measurement values or are interpolated.

Measurement data optimized in the previous step 8 are subsequently used to generate a map from the radar-based measurement data 10. If a map was already generated from earlier measurements, the optimized measurement data are used to update the map 10.

The generated map may now be used to locate 12 the at least one vehicle. For this purpose, the measurement data ascertained 2 by at least one vehicle are compared 12 with the measurement data stored 10 as a map. An agreement of the ascertained measurement data 2 with the measurement data stored as a map 10 may yield a position 14 of the at least one vehicle on the map.

Following a generation of the map from the optimized measurement data 10, the map may be additionally compressed 16.

Method 1 thus includes a portion for generating a map M and a portion for locating L at least one vehicle on the basis of the generated map.

What is claimed is:

1. A method for mapping a surroundings of at least one vehicle and for locating the at least one vehicle, the method comprising:
    ascertaining, by at least one radar sensor of the at least one vehicle, measurement data of the surroundings of the vehicle;
    aggregating the measurement data of the at least one radar sensor to reduce a measurement data density of the ascertained measurement data and to reduce a storage space requirement of the measurement data;
    comparing the aggregated measurement data with existing aggregated measurement data;
    optimizing, based on the comparison between the aggregated measurement data and the existing aggregated measurement data, the aggregated measurement data by reducing measurement errors;
    generating or updating, based on the optimized aggregated measurement data, a map; and
    locating the at least one vehicle on the generated or updated map by comparing the ascertained measurement data with the generated or updated map;
    wherein the ascertained measurement data pointing to ghost targets are deleted, by applying a density-based spatial cluster analysis or a k-means algorithm to the ascertained measurement data,
    wherein in the aggregating, directions of transmitted and received radar waves are used to combine the ascertained measurement data into measurement point clouds, which are groups of measurement points, wherein the groups are formed into formed groups as a function of a receiving angle of reflected radar waves, and wherein distances between the formed groups are measured or calculated, and the distances are compared to the distances of the existing aggregated measurement data to reduce deviations of the ascertained measurement data.

2. The method as recited in claim 1, wherein the measurement data of the at least one radar sensor are aggregated by a cluster analysis.

3. The method as recited in claim 1, wherein the measurement data of the at least one radar sensor are filtered.

4. The method as recited in 1, wherein the aggregated measurement data form nodes, and connecting paths between the nodes are formed and compared for the comparison with the existing aggregated measurement data.

5. The method as recited in claim 4, wherein at least one node is formed based on at least one measurement data cloud.

6. The method as recited in claim 4, wherein the nodes represent measurement locations of the at least one radar sensor and the connecting paths between the measurement locations are ascertained odometrically.

7. The method as recited in claim 1, wherein the aggregated measurement data are compared with measurement data of at least one second sensor for reducing measurement errors.

8. The method as recited in claim 1, wherein the map is updated by superimposing optimized aggregated measurement data.

9. The method as recited in claim 1, wherein the generated map is compressed.

10. The method as recited in claim 1, wherein the generated map is compressed by cluster formation, each cluster of the generated map being assigned a time stamp and older clusters being replaced by corresponding current clusters when the map is updated.

11. The method as recited in claim 10, wherein the compressed map is analyzed for detecting objects.

12. The method as recited in claim 1, wherein the generated map is linked to at least one geographic map.

13. A system for mapping a surroundings of at least one vehicle and for locating the at least one vehicle, comprising:

at least one vehicle having at least one radar sensor to ascertain measurement data;

at least one external and/or internal processing unit to generate or update a map based on the ascertained measurement data and to locate the at least one vehicle based on the ascertained measurement data;

wherein the at least one external and/or internal processing unit is configured to aggregate the measurement data of the at least one radar sensor to reduce a measurement data density of the ascertained measurement data and to reduce a storage space requirement of the measurement data, and to compare the aggregated measurement data with existing aggregated measurement data, wherein based on the comparison between the aggregated measurement data and the existing aggregated measurement data, the processing unit is further configured to optimize the aggregated measurement data by reducing measurement errors, and generate or update the map based on the optimized aggregated measurement data, wherein the ascertained measurement data pointing to ghost targets are deleted, by applying a density-based spatial cluster analysis or a k-means algorithm to the ascertained measurement data, wherein in the aggregating, directions of transmitted and received radar waves are used to combine the ascertained measurement data into measurement point clouds, which are groups of measurement points, wherein the groups are formed into formed groups as a function of a receiving angle of reflected radar waves, and wherein distances between the formed groups are measured or calculated, and the distances are compared to the distances of the existing aggregated measurement data to reduce deviations of the ascertained measurement data.

* * * * *